No. 662,160. Patented Nov. 20, 1900.
E. L. & S. B. ALEXANDER.
NON-PUNCTURABLE PNEUMATIC TIRE.
(Application filed Aug. 11, 1900.)
(No Model.)
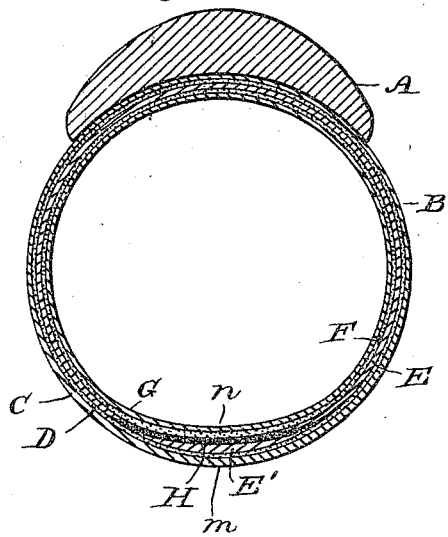
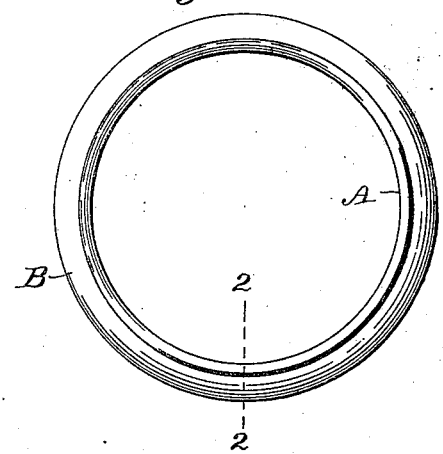
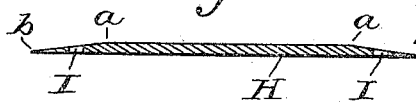
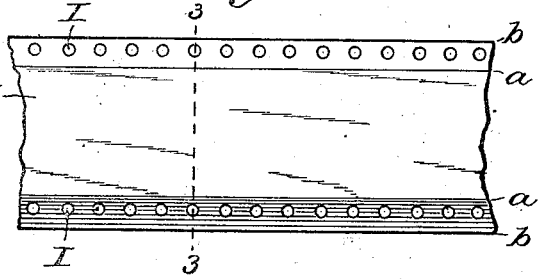
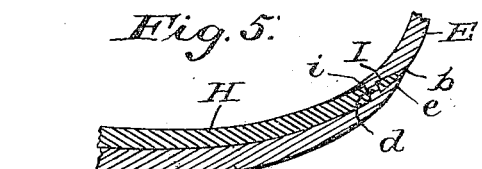
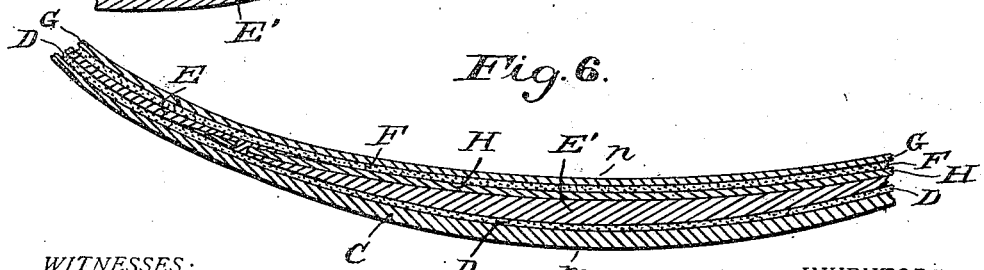
WITNESSES:
INVENTORS:
E. L. Alexander.
S. B. Alexander.
BY
E. T. Silvius.
ATTORNEY.

UNITED STATES PATENT OFFICE.

EDGER L. ALEXANDER AND SAMUEL B. ALEXANDER, OF INDIANAPOLIS, INDIANA.

NON-PUNCTURABLE PNEUMATIC TIRE.

SPECIFICATION forming part of Letters Patent No. 662,160, dated November 20, 1900.

Application filed August 11, 1900. Serial No. 26,607. (No model.)

*To all whom it may concern:*

Be it known that we, EDGER L. ALEXANDER and SAMUEL B. ALEXANDER, citizens of the United States, residing at Indianapolis, in the county of Marion and State of Indiana, have invented certain new and useful Improvements in Non-Puncturable Pneumatic Tires; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention relates to the class of pneumatic tires in which provision is made in forming the tire for preventing accidental puncturing of the air-retaining chamber.

The object of the invention is to provide a pneumatic tire of this character which shall be practically puncture-proof in use and at the same time be light and durable and also afford a proper amount of resiliency.

The invention consists in a tire provided with a puncture-proof strip formed of such material as rawhide or pressed fiber of a suitable character and formed as substantially an integral part of the tire, being inlaid between layers of the material of which the tire may be composed in such position as to protect against puncturing through the tread portion; and the invention consists also in the parts and combination and arrangement of parts hereinafter particularly described and claimed.

Referring to the drawings, Figure 1 represents a vertical transverse sectional view of a portion of a tire embodying our invention; Fig. 2, a side elevation of a wheel-rim or felly having a tire thereon of this character and indicating by the line 2 2 the position at which the sectional view in Fig. 1 is taken; Fig. 3, a plan view of a portion of the puncture-proof strip; Fig. 4, a transverse vertical sectional view of the puncture-proof strip on a line 3 3 in Fig. 3; Fig. 5, a fragmentary view in section corresponding to that in Fig. 1, showing details of construction of some of the parts; and Fig. 6, an enlarged fragmentary view in section also corresponding to that in Fig. 1, showing the various layers or laminations embodied in the details of construction.

Similar reference characters in the several figures of the drawings designate similar parts.

In order to be understood, since a pneumatic tire B as a whole is continuous and all parts substantially alike it is only necessary to consider a section of the whole, and particularly that portion which forms the tread, so that the tread $m$ may be termed the "bottom" of the section, (shown in Fig. 1,) and the part next the rim A is termed the "top."

In illustrating our invention a "single-tube" or "hose-pipe" tire is shown, and obviously it may be modified at the top portion or where it is applied to the rim in any suitable manner to adapt it for a "case" to receive an air-retaining tube or "inner" tube.

In construction the tire in cross-section is substantially circular, inasmuch as the air-pressure will tend to retain it in circular form, since the pressure would be equal in all directions, it being assumed that the walls are of equal strength. However, the periphery may deviate slightly from a true circle should the outer layer of rubber be increased in thickness at the tread portion $m$, as shown. The tire B includes such outer wear-layer C, and next inside of that is a layer of fabric D, formed to a true circle in transverse section and attached continuously to the outer layer of rubber. This layer of fabric D is preferably extra strong, so as to mainly resist the strains and also to stand wear when the rubber cover C shall have worn away, as it invariably does in use. Next above the fabric D at that portion comprising the tread is a filling-strip E' of soft rubber of the character employed in making tires, and this is tapering from its center to its edges, taken transversely, so that when in position in the tire it is convex at its under surface and concave at its upper surface, the radius of the upper circular section being greater than the radius of the under circular section. At the upper or inner side of the filling-strip E' we apply the puncture-proof strip H, which is practically continuous throughout the tire and of sufficient breadth to extend across that portion which comprises the tread of the tire, being about equal in width to the width of the filling-strip E', which also is continuous in length. The strip H when composed of rawhide or similar material having one side more compact or tough than the other side thereof is placed so that the tougher and, if possible, more glazed side shall be the outer side or that next to the filling-strip E', so as to more readily prevent accidental cutting thereof by broken glass or tacks and the like. The strip H may be composed of suitably-prepared fiber compressed or of rawhide so dressed as to leave it pliable. With this arrangement of the filling-piece E' the strip H lies more nearly straight across the tire than it would if placed against the fabric D, and hence is more easily deflected when in contact with the ground, especially in tires of small diameter; but in larger vehicle-tires we may omit the filling-strip E'. The strip H is tapering along its edges, as from $a$ to $b$, and in the tapering or beveled portions are preferably rows of comparatively large perforations I, arranged somewhat closely together. A rubber lining E extends around the balance of the internal surface of the fabric D and overlaps the beveled portions from $b$ to $a$ of the strip H and also extends as connecting-studs $d$ through the perforations I to the edges of the filling-strip E', to which the studs are attached, being formed either integrally or cemented thereto, the edges $i$ of the lining being thin and extending beyond the thin edges $e$ of the strip E' when such is employed, and when not employed the studs $d$ may be attached to the fabric D, or the perforations I may in the latter case be utilized in sewing the strip H to the fabric D. Next, at the inside of the strip H and lining E is a layer of fabric F, extending throughout the tire, and, if then desired, a separate inner tube may be applied for retaining the air; but if employed as a single-tube tire an inner rubber lining G is applied to the fabric F.

In this construction the tire is somewhat thicker at the tread, as from $m$ to $n$, than at the unexposed portion in the balance of the tire at the sides and at the top or adjacent the rim. In the part about $n$ the radius of the interior is greater than at the exterior about the tread $m$, so that the pressure of air would tend to push out the tread portion toward a true circle at $n$; but this is overcome sufficiently by the increased strength of the tread portion and also by the fabric D, which is formed to a true circle.

In the tires of large diameter when the filling-strip may be omitted the inner layers of fabric and rubber would be circular, the same as the outer layers.

Having thus described our invention, what we claim, and desire to secure by Letters Patent, is—

1. In a pneumatic tire having the inner and the outer layers of fabric arranged concentrically in cross-section and having the puncture-proof strip between said layers, the combination with said strip, of the layer of rubber extending only around the upper and side portions of said tire between said layers of fabric and having its edges extending over the upper sides of the edges of said strip whereby the edges of said strip are pressed down against the outer one of said layers of fabric, and the strip of rubber extending along the central portion of said strip whereby the same is pressed up against the inner one of said layers of fabric, substantially as and for the purposes shown and described.

2. In a pneumatic tire having the inner and the outer layers of fabric arranged concentrically in cross-section and having the puncture-proof strip provided with the perforations near the edges thereof, the combination of the layer of rubber extending only around the upper and side portions of said tire between said layers of fabric and having its edges extending over the upper sides of the edges of said strip and over said perforations whereby the edges of said strip are separated from said inner layer of fabric and pressed against said outer layer of fabric, and the strip of rubber having the thick central portion bearing against the under side of said puncture-proof strip and pressing the same up against said inner layer of fabric and supported by said outer layer of fabric and having its edges extending to and through said perforations and connected securely to the edges of said layer of rubber that extend over the upper edges of said puncture-proof strip, substantially as and for the purposes shown and described.

3. The herein-described puncture-proof armor for pneumatic tires, the same consisting of the flexible continuous narrow strip H, the elastically-flexible strip E' at the under side of said strip H, and approximately the same in width, and the elastically-flexible layer E extending from the upper side of one edge of said strip H outwardly and upwardly and down to the upper side of the opposite edge of said strip and attached thereto, and a layer at each side of said formation, substantially as and for the purposes shown and described.

In testimony whereof we affix our signatures in presence of two witnesses.

EDGER L. ALEXANDER.
SAMUEL B. ALEXANDER.

Witnesses:
WM. C. THOMPSON,
E. T. SILVIUS.